(12) United States Patent
von Below

(10) Patent No.: US 6,631,468 B1
(45) Date of Patent: Oct. 7, 2003

(54) BOOTABLE PACKET WRITTEN RE-WRITABLE OPTICAL DISC AND METHODS FOR MAKING SAME

(75) Inventor: Alexander G. von Below, Aachen (DE)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/464,332

(22) Filed: Dec. 15, 1999

(51) Int. Cl.$^7$ .............................. G06F 9/24; G06F 9/00; G06F 9/445
(52) U.S. Cl. ............................................... 713/2; 711/4
(58) Field of Search ............................. 713/1, 2; 711/1, 711/4, 171, 172, 173; 360/135; 369/13.56

(56) References Cited

U.S. PATENT DOCUMENTS

| | | | |
|---|---|---|---|
| 5,475,540 A | 12/1995 | Gold | 360/48 |
| 5,623,470 A | 4/1997 | Asthana et al. | 369/58 |
| 5,721,856 A * | 2/1998 | Takeuchi | 711/1 |
| 6,091,686 A | 7/2000 | Caffarelli et al. | 369/58 |
| 6,122,734 A * | 9/2000 | Jeon | 713/2 |
| 6,134,626 A * | 10/2000 | Inokuchi et al. | 711/4 |
| 6,141,772 A * | 10/2000 | Hashimoto | 714/16 |
| 6,304,965 B1 * | 10/2001 | Rickey | 713/2 |

OTHER PUBLICATIONS

Stevens and Merkin, "'El Torito' Bootable CD–ROM Format Specification", Version 1.0, pp. 1–20, Jan. 25, 1995, Phoenix Technologies and IBM.

Unknown, "Volume and File Structure for Write–Once and Rewritable Media using Non–Sequential Recording for Information Interchange", Standard ECMA–167, 3$^{rd}$ Ed., Jun. 1997. <http://www.ecma.ch>.

Unknown, "Volume and File Structure of CDROM for Information Interchange", Standard ECMA–119, 2$^{nd}$ Ed., Dec. 1987, Reprint Sep. 1998. <http://www.ecma.ch>.

Unknown, "Universal Disk Format™ Specification", OSTA–2, Rev. 2.00, Apr. 3, 1998, Optical Storage Technology Assn., Santa Barbara, CA.

* cited by examiner

Primary Examiner—Thomas Lee
Assistant Examiner—Thuan Du
(74) Attorney, Agent, or Firm—Martine & Penilla, LLP

(57) ABSTRACT

The present invention provides a method and a computer readable medium for writing fixed packet data to create a bootable optical disc. Each of the fixed packets includes a set of data blocks with a set of link blocks separating a pair of consecutive fixed packets. A first packet is written onto a re-writable compact disc including a boot record that has a pair of pointers for pointing to locations of associated boot catalogs. One pointer is used to point to a location of an associated boot catalog. An emulated boot image of a source medium is created for the re-writable compact disc. For a first device that is capable of reading the link blocks, a first boot catalog is written in a second packet where the first boot catalog includes a pointer to a location of a first boot image that can be executed to boot up a computer system. For a second device that is capable of skipping the link blocks, a second boot catalog is written in the second packet where the second boot catalog includes a pointer to a location of a second boot image that can be executed to boot up the computer system. A first boot image is written to emulate the source medium having bad sectors that correspond to the locations of the link blocks in the compact disk such that reading of the first boot image is not interrupted when booting up the computer system from the first boot image. A second boot image is written without emulating the bad sectors corresponding to the locations of the link blocks in the compact disk.

43 Claims, 7 Drawing Sheets

| MODE1 | | MODE2 | | DESCRIPTION |
|---|---|---|---|---|
| DEC | HEX | DEC | HEX | |
| 0 | 0 | 0 | 0 | NULL |
| ⋮ | ⋮ | ⋮ | ⋮ | |
| 16 | 10 | 16 | 10 | ISOPVD |
| 17 | 11 | 17 | 11 | El Torito Bootrecord |
| 18 | 12 | 18 | 12 | Joliet SVD |
| 19 | 13 | 19 | 13 | ISO Volume Descriptor Terminator |
| 20 | 14 | 20 | 14 | Begin Extended Area (BEA) |
| 21 | 15 | 21 | 15 | NSR02 |
| 22 | 16 | 22 | 16 | Terminating Extended Area (TEA) |
| 23 | 17 | 23 | 17 | L-Path Table |
| 24 | 18 | 24 | 18 | M-Path Table |
| 25 | 19 | 25 | 19 | Readme.txt |
| 26 | 1A | 26 | 1A | Autorun.inf |
| 27 | 1B | 27 | 1B | Inf |
| 28 | 1C | 28 | 1C | NULL |
| ⋮ | | | | |
| 32 | 20 | 39 | 27 | ISO Root Dir |
| 33 | 21 | 40 | 28 | Joliet Dir |
| 34 | 22 | 41 | 29 | Boot Catalog |
| 35 | 23 | 42 | 2A | Tools Dir (Mode 2) |
| ⋮ | | | | |
| 39 | 27 | 46 | 2E | ISO Root Dir |
| 40 | 28 | 47 | 2F | Joliet Dir |
| 41 | 29 | 48 | 30 | Boot Catalog |
| 42 | 2A | 49 | 31 | Tools Dir (Mode 1) |
| | | | | AUTOEXEC.BAT + NULL |
| ⋮ | | | | |
| 64 | 40 | 78 | 4E | UDF Reader + NULL |
| ⋮ | | | | |
| 192 | C0 | 234 | EA | UDF PVD |
| 193 | C1 | 235 | EB | UDF PD |
| 194 | C2 | 236 | EC | UDF Unallocated Space Descriptor |
| 195 | C3 | 237 | ED | UDF Fill Logical Volume Descriptor |
| 196 | C4 | 238 | EE | Implementation Use Volume Descriptor |
| 197 | C5 | 239 | EF | Terminating Descriptor |
| ⋮ | | | | |
| 208 | D0 | 250 | FA | UDF PVD |
| 209 | D1 | 251 | FB | UDF PD |
| 210 | D2 | 252 | FC | UDF Unallocated Space Descriptor |
| 211 | D3 | 253 | FD | UDF Fill Logical Volume Descriptor |
| 212 | D4 | 254 | FE | Implementation Use Volume Descriptor |
| 213 | D5 | 255 | FF | Terminating Descriptor |
| ⋮ | | | | |
| 224 | E0 | 273 | 111 | Sparing Table |
| ⋯ | | | | |
| 256 | 100 | 312 | 138 | AVDP |
| ⋯ | | | | |
| | | | | DOSRESTR.EXE |
| | | | | Tool files |
| | | | | STARTING AT A PACKET |
| | | | | Packet Grenze: |
| | | | | BOOTIMAGE Mode 1 |
| | | | | BOOTIMAGE Mode 2 |
| 288 | 120 | 351 | 15F | FileSetDescriptor |
| 289 | 121 | 352 | 160 | Non-Allocatable Space File Entry |
| 290 | 122 | 353 | 161 | NULL |
| ⋯ | | | | |
| 320 | 140 | 390 | 186 | Logical Volume Integrity Descriptor |
| 321 | 141 | 391 | 187 | Volume Descriptor Terminator |
| 322 | 142 | 392 | 188 | Free Space Bitmap |
| 323 | 143 | 393 | 189 | NULL |
| ⋮ | | | | |
| 347 | 15B | 417 | 1A1 | C2 Defect Mangement |
| 348 | 15C | 418 | 1A2 | NULL |
| ⋮ | | | | |
| 352 | 160 | 429 | 1AD | NULL |
| ⋯ | | | | |
| 664 | 360 | 1053 | 41D | Root Directory |
| 665 | 361 | 1054 | 41E | NULL |
| ⋯ | | | | |

FIG. 4

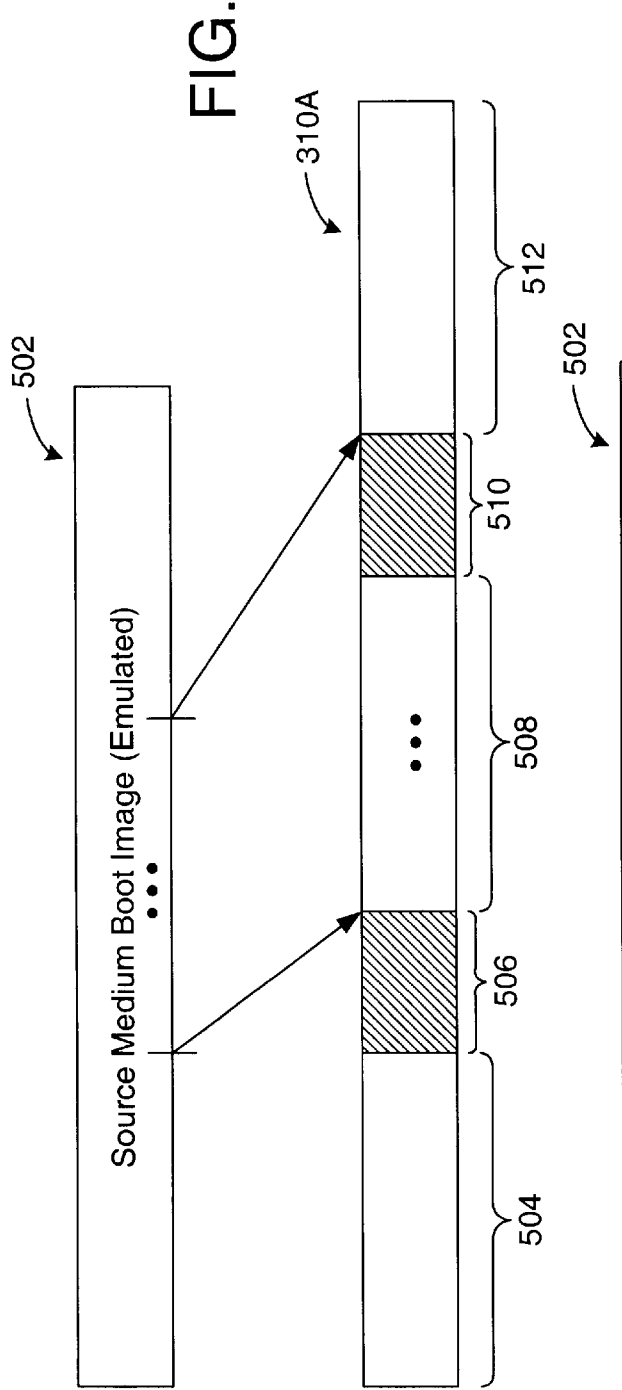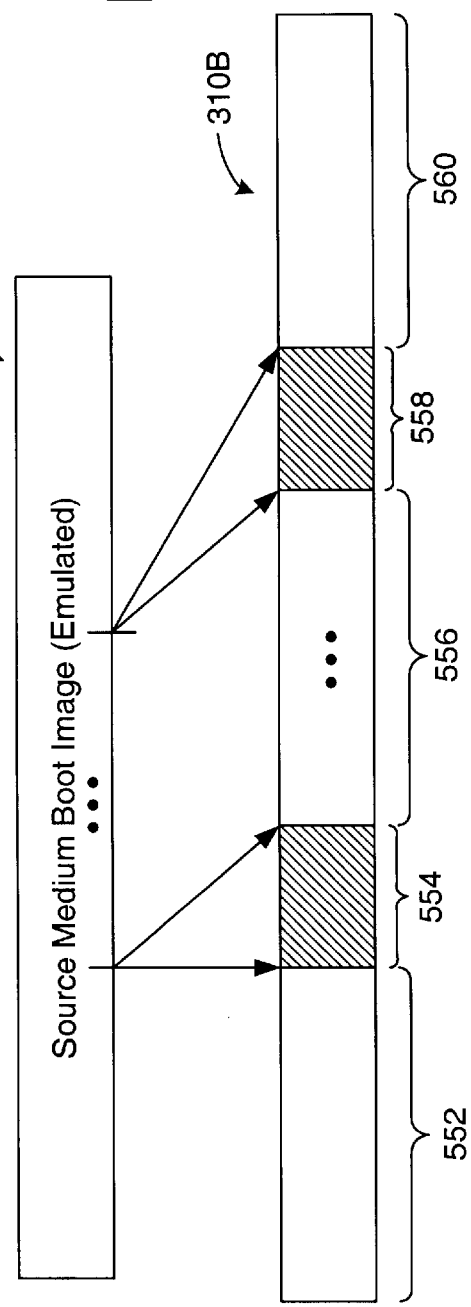

BOOTABLE PACKET WRITTEN RE-WRITABLE OPTICAL DISC AND METHODS FOR MAKING SAME

CROSS REFERENCE TO RELATED APPLICATIONS

The present application claims is related to U.S. patent application Ser. No. 09/464,325 filed on Dec. 15, 1999, entitled "Bootable Incremental Packet Optical Media," by inventor Alexander G. von Below, which is incorporated herein by reference.

BACKGROUND OF THE INVENTION

1. Field of the Invention

This invention relates generally to optical storage media, and more particularly to methods and computer readable media for writing and reading to and from compact disc (CD) media.

2. Description of the Related Art

In recent years, compact disc (CD) recording technology has made substantial advancements that have enabled casual computer users to record all types of digital data to the CD media. As is well known, there are several types of CD media recording standards and associated media. For example, ISO-9660 (also known as ECMA-119) provides a file system for CD-ROMs. Specifically, the ISO 9660 provides a standard specifying how data shall be structured on a CD-ROM. Most platforms such as Microsoft Windows® and DOS® can read CD-ROM discs conforming to the ISO 9660.

However, the ISO 9660 standard does not provide means for changing or adding data on CD-ROMs. To overcome such limitations, the OSTA Universal Disk Format (UDF) has been created to implement ISO-13346 (also known as ECMA-167). Whereas ISO-13346 is a broad, general standard for storing information on any medium, the UDF specifically provides a standard for storing data not only on CD-ROMs but also on recordable and re-writable optical discs such as CD-Recordable (CD-R) and CD-Re-writable (CD-RW) as well as DVDs. Writing data in accordance with the UDF standard provides great flexibility in terms of transferring data between a CD medium and other storage devices, such as hard disks and floppy disks.

The CD-R and CD-RW discs differ in the manner data can be written. Specifically, CD-R disc is a write once media where data can be recorded only once over a single session or during multiple sessions. This is because the data that is digitally written to the CD-R causes a permanent change in the properties of the CD-R. This change in property is often referred to as the "burning" of data onto the CD.

On the other hand, data can be written and rewritten on a CD-RW disc much like a hard disk or a floppy disk. That is, data may be written to the CD-RW in fixed packet sizes and then erased and recorded again repeatedly. This is because the CD-RW, unlike CD-R, performs recording by making use of phase change materials in its recording layer. When the phase change material is irradiated by a laser beam, the data can be erased (crystal phase) and recorded (amorphous phase). Then, by way of differences in the reflectivity of either the crystal phase or amorphous phase, the data stored on the media can be read. However, data recorded on CD-RW media is typically not readable by standard CD-ROM drives.

For writing to re-writable optical media such as CD-RW discs, the UDF standard provides writing in "incremental packet mode," which is well known and described in detail in UDF standards such as UDF 1.5 and 2.0, which are incorporated herein by reference. In the incremental packet mode, data is written in units of packets. The writing of data in units of small packets provides a more efficient means for writing data onto CD-RW discs. For example, before the implementation of incremental packet mode, if a data stream is interrupted while writing the data to a CD-RW disc, for example, the disc was no longer usable. In incremental packet mode writing, however, if a data stream is interrupted while writing fixed data packet to the CD-RW disc, only the interrupted packet becomes useless. In this case, new packets may be written after the interrupted packet such that the disc still contains useful data.

In general, optical discs are substantially cheaper than other mass storage media such as hard disk drives of comparable size. As a result, the optical discs are being widely used to store data for a variety of purposes. For example, the CD-RW discs are frequently used to backup hard one or more disk drives in a computer system. Additionally, the CD-RW media may be used to store custom software for distribution. The data stored in the CD-RW media may then be restored or installed on a computer system.

Restoring or installing data from optical media, however, often requires the use of a separate boot disk such as a floppy disk. For example, to restore data in a disaster recovery situation generally requires the user to insert a boot floppy disk to load an operating system before accessing the optical discs. Also, installing a custom software from a CD-RW disc often requires booting up the computer system by inserting a boot disk.

One prior art standard called "El Torito" defines a specification for a bootable CD-ROM format and is available from Phoenix Technologies and IBM. Specifically, the El Torito standard, also known as "CD/OS," specifies a bootable CD-ROM format that allows a computer system to boot up from a CD-ROM, which conforms to the El Torito standard. Thus, a separate floppy boot disk is not required. The El Torito standard is well known in the art and is incorporated herein by reference.

Unfortunately, however, the El Torito standard does not provide a solution for booting up from a CD-RW media that conform with the UDF standard. In particular, the El Torito standard is not applicable to re-writable CD-RW discs that are written using incremental fixed packet writing mode. Instead, the El Torito specification is directed to providing a bootable CD-ROM only.

Additionally, CD-R discs are written using sequential writing methods such as track-at-once, session-at-once, disc-at-once, variable packet length writing, etc. In contrast, the conventional CD-RW discs can also be written using fixed length packets in addition to the various methods used for writing to the CD-R discs. This is because the CD-RW discs allows individual packets to be re-written in comparison with other methods where only complete tracks can be re-written.

FIG. 1A shows a physical layout of an exemplary CD-RW disc 100. In the CD-RW disc, a plurality of usable blocks 102 and link blocks 104 are laid out in sequence. Each of the usable blocks 102 and link blocks 104 are typically of fixed lengths. For example, each of the usable blocks 102 in which data may be written typically includes a fixed number of blocks such as 32 blocks. On the other hand, each of the link blocks 104 represents a slack space in which user data is not written and typically includes 7 blocks.

As is well known, although the link blocks 104 do not contain user data, they provide information (e.g., synchronization data, control data, etc.) necessary for proper reading of the CD-RW disc 100. Individual blocks in the usable and link blocks 102 and 104 generally include 2,048 bytes or 2 Kbytes, respectively.

In this configuration, the first usable block 102 includes 32 blocks from block B0 to block B31. Then, a link block 104 of seven blocks from block B32 to B38 follows. Following this link block 104 is another usable block 102 having blocks B39 to B70 and so on. In this manner, each of the usable blocks 102 represent a data space into which a fixed packet of data can be written.

Currently, two types of CD-RW devices are being widely used in the market: mode 1 and mode 2 devices. Mode 2 devices simply map out the bad blocks, i.e., link blocks 102, as their occurrence is deterministic. FIG. 1B illustrates a schematic diagram of a CD-RW disc 100A as seen by a mode 2 device. In this diagram, the mode 2 device skips the link blocks 104. By thus skipping the link blocks 104, the mode 2 devices reads the blocks in the usable data blocks 102 in sequence as if no link block existed. For example, the first block B32 in the second usable data block 102 is treated as the next block of the block B31 in the first usable data block 102. In this manner, the mode 2 devices read only usable data.

In contrast, mode 1 devices read every block in a CD-RW disc including both the usable data blocks 102 and link blocks 104. FIG. 1C shows a schematic diagram of a CD-RW disc 100B as seen by a mode 1 device. As shown, the mode 1 device reads every block in the usable data and link blocks 102 and 104 in sequence. For instance, the first block B32 in the first link block 104 is read immediately after the last block B31 in the first usable data block 102. In this case, an error condition is generated because the block B32 does not contain useful data.

However, when a boot image is to be written onto an optical media such as CD-RW discs that use fixed size packets, the entire boot image may not fit within a single packet. For example, a boot image of a floppy disk may be 1.44 Mbytes. In contrast, a single usable data packet is only 32 blocks, each of which is 2 Kbytes. Hence, a single data packet may contain only 64 Kbytes. Accordingly, a boot image of 1.44 Mbytes will generally be written over more than two fixed-size packets with intervening link blocks. Due to the interruption in the boot image in such cases, a computer system attempting to boot up from such boot image using a mode 1 device will typically generate an error condition, thereby preventing proper booting up of the computer system.

In view of the foregoing, there is a need for methods of writing fixed packet re-writable optical media such as CD-RW in an incremental packet mode to allow computers to boot up from these media without a dedicated boot disk.

SUMMARY OF THE INVENTION

Broadly speaking, the present invention fills these needs by providing methods and computer readable media for writing data to re-writable optical media in a fixed packet mode to allow computers to bootup without a dedicated boot disk. It should be appreciated that the present invention can be implemented in numerous ways, including as a process, an apparatus, a system, computer readable media, or a device. Several inventive embodiments of the present invention are described below.

In one embodiment, the present invention provides a method for writing fixed packet data to create a re-writable compact disc that is bootable in dual modes. Each of the fixed packets includes a set of data blocks with a set of link blocks separating a pair of consecutive fixed packets. A first packet is written onto a re-writable compact disc including a boot record that has a pair of pointers for pointing to locations of associated boot catalogs. One pointer is used to point to a location of an associated boot catalog. An emulated boot image of a source medium is created for the re-writable compact disc. For a first device that is capable of reading the link blocks, a first boot catalog is written in a second packet where the first boot catalog includes a pointer to a location of a first boot image that can be executed to boot up a computer system. For a second device that is capable of skipping the link blocks, a second boot catalog is written in the second packet where the second boot catalog includes a pointer to a location of a second boot image that can be executed to boot up the computer system. A first boot image is written to emulate the source medium having bad sectors that correspond to the locations of the link blocks in the compact disk such that reading of the first boot image is not interrupted when booting up the computer system from the first boot image. A second boot image is written without emulating the bad sectors corresponding to the locations of the link blocks in the compact disk.

In another embodiment, the present invention provides a method for writing data packet to create a bootable CD-RW disc. Each data packet includes a set of data blocks with a set of link blocks separating a pair of consecutive data packets. The method comprising: (a) writing a first packet onto a CD-RW disc including a boot record for pointing to a location of a boot catalog; (b) writing a first boot catalog for pointing to a location of a first boot image that can be executed to boot up a computer system that uses a device capable of reading the link blocks; (c) generating a boot image of a source medium for the CD-RW disc; and (d) writing the boot image as a first boot image by emulating the source medium having bad sectors that correspond to the locations of the link blocks in the compact disk such that reading of the first boot image is not interrupted when booting up the computer system from the first boot image.

In yet another embodiment, a computer readable medium having program instructions for writing fixed data packet to create a bootable optical disc is disclosed. Each data packet includes a set of data blocks with a set of link blocks separating a pair of consecutive data packets. The computer readable medium comprising: (a) program instructions for writing a first packet onto an optical disc including a boot record for pointing to locations of at least two boot catalogs; (b) for a mode 1 device that is capable of reading the link blocks, program instructions writing a first boot catalog for pointing to a location of a first boot image that can be executed to boot up a computer system that uses a mode 1 device; (c) for a mode 2 device that is capable of mapping out the link blocks, program instructions writing a second boot catalog for pointing to a location of a second boot image that can be executed to boot up the computer system that uses a mode 2 device; (d) program instructions for generating an emulated boot image of a source medium for the optical disc; (e) program instructions for writing the emulated boot image as the first boot image by emulating the source medium having bad sectors that correspond to the locations of the link blocks in the compact disk such that reading of the first boot image is not interrupted when booting up the computer system from the first boot image; and (f) program instructions for writing the emulated boot image as the second boot image without emulating the bad sectors corresponding to the locations of the link blocks in the compact disk.

Advantageously, the present invention allows computer systems to boot up directly from fixed packet random access optical discs without using a dedicated bootup disk. In addition, by taking ensuring that the bad blocks in the bootable source medium occur at the locations corresponding to link blocks, the interruptions in reading a boot image in a CD-RW disc is eliminated. Accordingly, such discs allow a computer system to boot up without interruptions. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

FIG. 4 shows a more detailed list of descriptions of logical and physical blocks for mode 1 and mode 2 formats in accordance with one embodiment of the present invention.

FIGS. 5A and 5B illustrate a more detailed schematic block diagram of the mode 1 boot image in accordance with one embodiment of the present invention.

DETAILED DESCRIPTION OF THE PREFERRED EMBODIMENTS

The present invention provides methods and computer readable medium for writing CD-RW media in a fixed packet mode to allow computers to boot up from these media without a dedicated boot disk. It will be obvious, however, to one skilled in the art, that the present invention may be practiced without some or all of these specific details. In other instances, well known process operations have not been described in detail in order not to unnecessarily obscure the present invention.

The present invention uses incremental packet mode writing to create a re-writable optical medium to allow computers to bootup from the optical medium without a dedicated boot disk. In accordance with one embodiment, CD-RW discs are written using fixed length packets. For example, the size of a packet may be 32 blocks with 7 blocks of slack (i.e., link) space provided between a pair of consecutive packets as used, for example, in DirectCD™ of Adaptec, Corp. of Milpitas, Calif. Each block is generally 2 Kbytes or 2,048 byte in size. Although the present invention is illustrated using such block configurations, other block and byte configurations are equally suitable for various embodiments of the present invention.

To accommodate booting from CD devices that read the slack space (e.g., mode 1 devices) and those that block out the link blocks (e.g., mode 2 devices), two boot images are written to a CD-RW disc in accordance with one embodiment of the present invention. For mode 2 devices, for example, the boot image may be conventional boot images because the mode 2 devices will block out the bad link blocks. On the other hand, for mode 1 devices, a boot image is created and written to the CD-RW disc in such a way that the boot image simulates a bootable source medium (e.g., floppy disk, hard disk, removable disk, etc.) with bad sectors. The bad sectors of the bootable source medium correspond to the link blocks in the CD-RW so that the boot image appears as a single piece to the boot BIOS even though the BIOS never tries to access the bad sectors.

Figure 1A:
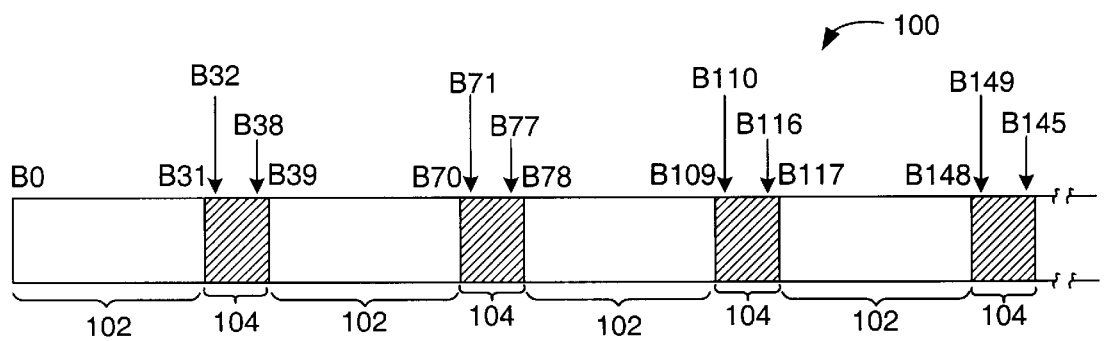
FIG. 1A shows a physical layout of an exemplary CD-RW disc.
Figure 1B:
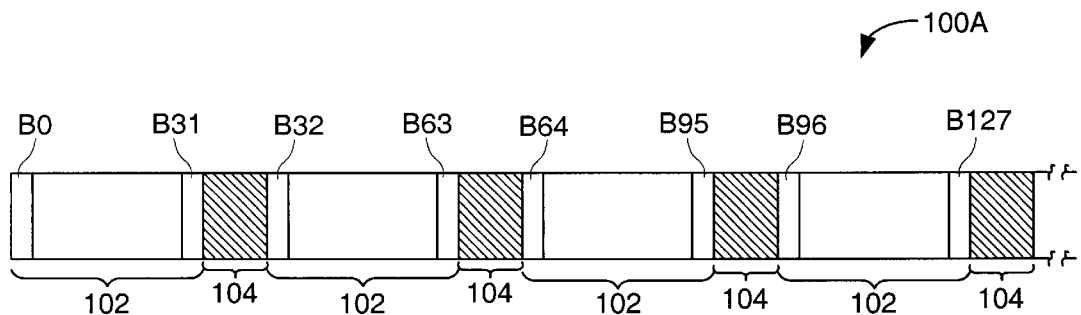
FIG. 1B illustrates a schematic diagram of a CD-RW disc from the perspective of a mode 2 device.
Figure 1C:
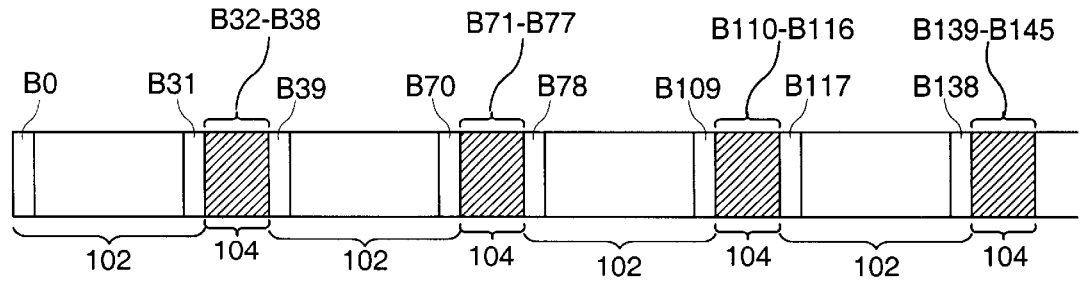
FIG. 1C shows a schematic diagram of a CD-RW disc from the perspective of a mode 1 device.
Figure 2:
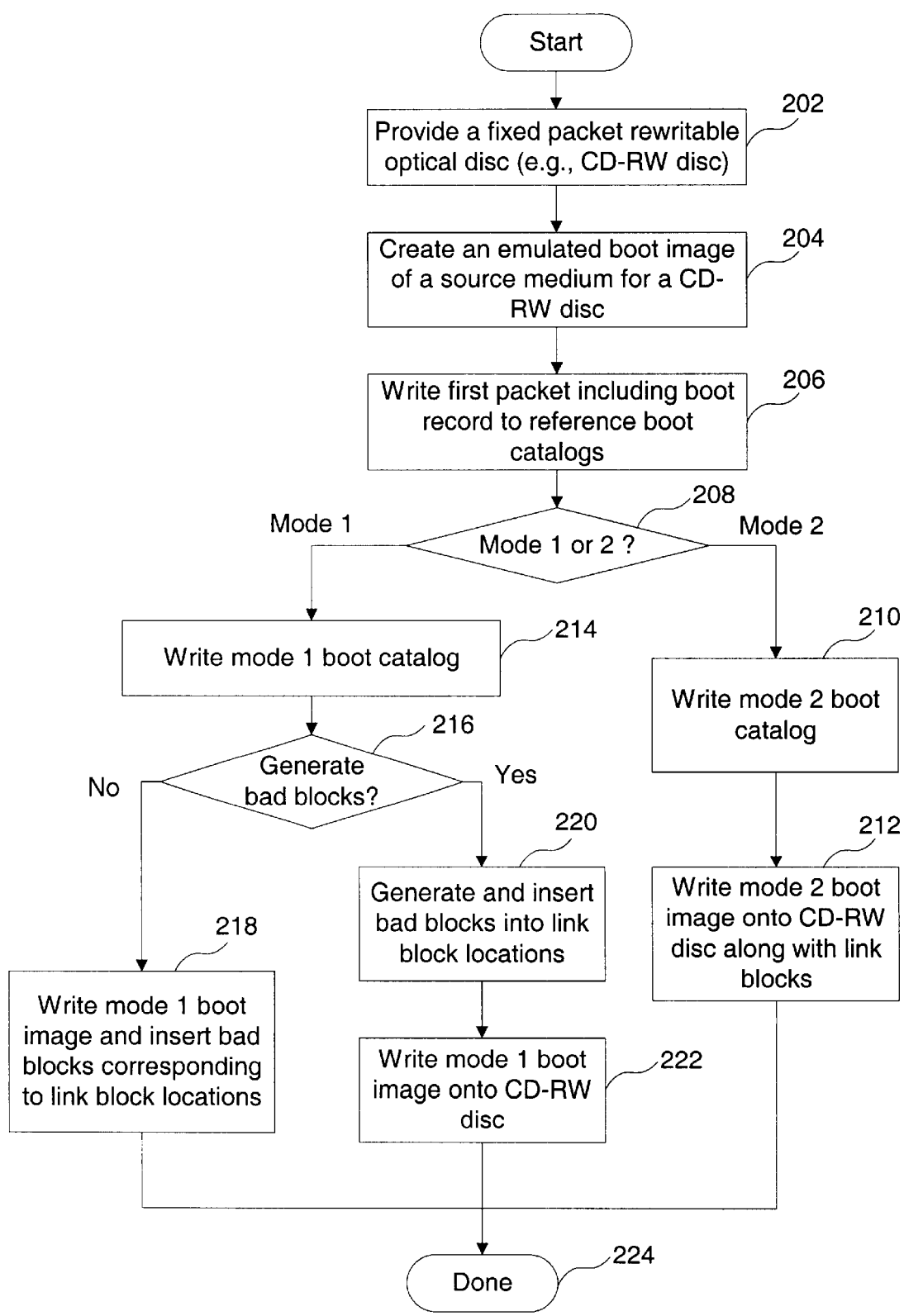
FIG. 2 is a flowchart of an exemplary method for writing data in incremental fixed packet mode to create a bootable CD-RW disc in accordance with one embodiment of the present invention.

FIG. 2 is a flowchart of an exemplary method for writing data in incremental fixed packet mode to create a bootable CD-RW disc in accordance with one embodiment of the present invention. The method begins in operation 202, wherein a CD-RW disc is provided to create a bootable disc. It should be noted, however, that the media can be any suitable re-writable optical media upon which data can be written and re-written using any fixed packet writing methods.

Then in operation 204, an emulated boot image is created from a source medium for the CD-RW disc. In accordance with one embodiment of the present invention, the boot image is an emulation of a source medium such as a floppy disk, a hard disk, or a removable disk. Creating a boot image for a source disk is well known in the art. For example, El Torito standard describes creating a boot image by reading from the source media as if it were a Logical-Block Addressable (LBA) device and incrementing the logical-block value until all sectors have been read. Then all blocks are concatenated in a single file. The LBA translation can be performed as follows:

LBA 0=Cylinder 0, Head 0, Sector 1; and

LBA X=((Cylinder*Maximum Heads+Head)*Sectors per Track)+Sector −1. The resulting file is placed on the disc in ISO-9660 format along with a catalog entry.

After the emulated boot image of a source medium has been created and stored in a memory unit of a computer system, the boot image can be written to the CD-RW disc to accommodate various device modes. For example, mode 1 devices typically read all blocks in a CD-RW disc including the valid data blocks and link blocks that contain invalid data such as error correction codes. In contrast, mode 2 devices skip or map out the bad link blocks so that they do not access the bad link blocks.

In the current embodiment, in operation 206, a first packet is written on the CD-RW disc including primary volume descriptors and boot record. Preferably, the primary volume descriptors are written in block 16 and the boot record is written in block 17 where the first packet includes data blocks numbered from 0 to 31. In one embodiment, the boot record contains a set of pointers for pointing to an associated boot catalog. For example, the boot record may include a pair of pointers, where one pointer is used reference the location of a mode 1 boot catalog while the other pointer references the location of a mode 2 catalog.

In accordance with a preferred embodiment, the CD-RW provides boot images for both mode 1 and mode 2 devices. Specifically, it is determined in operation 208 whether to create a mode 1 or mode 2 boot catalog and boot image. If mode 2 is selected in operation 208, a mode 2 boot catalog is written in operation 210, preferably in the second packet. The mode 2 packet includes a pointer for pointing to a location of the mode 2 boot image. Then, the mode 2 boot image is written onto another packet (e.g., packet 3, 4, etc.) in operation 212.

On the other hand, if mode 1 is selected in operation 208, the method proceeds to operation 210, where a mode 1 boot catalog is written, preferably in the second packet. Similar to the mode 2 boot catalog, the mode 1 boot catalog also includes a pointer for pointing to a location of the mode 1 boot image. It should be noted that both mode 1 and 2 catalogs and boot images are preferably written on the CD-RW disc to enable both mode 1 and 2 devices to boot up form the disc. Accordingly, the both branches of mode 1 and mode 2 operations may be performed either simultaneously or sequentially one after the other.

After writing the mode 1 boot catalog, preferably in the second packet, the method proceeds to operation 218, where an emulated boot disk with bad sectors is written over a plurality of packets. In one embodiment, as shown in operation 218, the boot image may be written to the CD-RW disc with interruption to allow bad sectors to be inserted whenever a link space is encountered. In another embodiment, as shown in operations 220 and 222, a new boot image is generated by inserting the bad sectors in place where link blocks are located. Then, the entire boot image is sequentially written onto the CD-RW disc. It should be noted that the mode 1 and 2 boot images may be written in any suitable packets such as packet 2, 3, 4, etc. However, for simplicity, the boot images are preferably byte aligned to the beginning of a packet. The method then terminates in operation 224.

Figure 3:
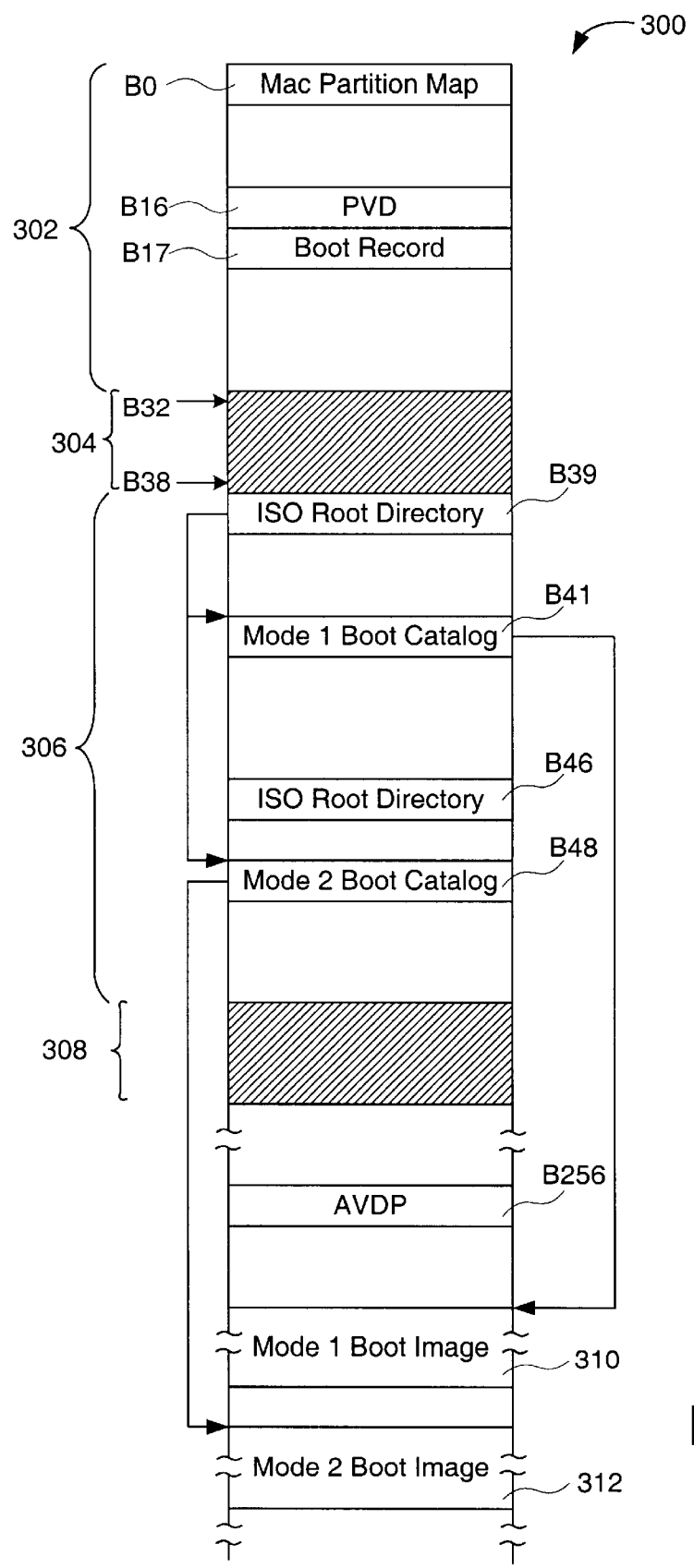
FIG. 3 shows a schematic block diagram of an exemplary bootable packet CD-RW disc created using a method shown in FIG. 2 in accordance with one embodiment of the present invention.

FIG. 3 shows a schematic block diagram of an exemplary bootable packet CD-RW disc 300 created using the method shown in FIG. 2 in accordance with one embodiment of the present invention. For convenience of illustration, the tracks on the disc 300 are illustrated linearly instead of the typical spiral configuration. The CD-RW disc 300 includes a first packet 302, a first link block 304, a second packet 306, a second link block 308, and a pair of boot images 310 and 312, and an AVDP at block B256. In addition, the CD-RW disc 300 may include more packets for storing data such as UDF data and other user data as will be shown in more detail in FIG. 4. In one embodiment, the block B0 can be used to store a pointer to a boot image or a partition for booting up an Apple™ MacIntosh™ computer platform. If the partition contains bootable boot image in subsequent packets, the computer will boot up using the boot image in the packets.

In this configuration, the first packet 302 includes primary volume descriptors at block B16 and a boot record at block B17. For example, the ISO 9660 primary volume descriptor and other ISO-9660 data are written starting from block B16. In particular, the primary volume descriptor is written in block B16, in accordance with the conventional ISO-9660 standard. Then, in block B17, a boot record volume descriptor, which includes pointers for referencing the locations of mode 1 and 2 boot catalogs, is written. It should be mentioned, however, that any number of pointers may be provided in block B17 to reference any number of boot catalogs. From block B18 and on, ISO-9660 information such as root directory for ISO-9660, restore application, and other information accessible from ISO-9660 may be written to reference data in the other packets since the first packet 302 is limited in size.

After the first link block 304, the second packet 306 is written to provide, among others, mode 1 and 2 boot catalogs for referencing the locations of the associated boot images. For example, the mode 1 boot catalog in block B41 points to the start of the mode 1 boot image 310 while the mode 2 boot catalog in block B48 points to the start of the mode 2 boot image 312. The boot catalogs and boot images are written, preferably aligned to the block boundaries of 2,048 bytes. Each of the boot catalogs contains a pointer to the associated boot image and is preferably written in a block. For example, as described in El Torito standard, the boot catalog contains an absolute pointer to the boot catalog and is a collection of 20 byte entries, packed 40 entries to the sector.

Additionally, the boot catalog may also include various platform information such as Intel™, Motorola™, PowerPC™, UNIX™, LINUX™, etc. The platform information allows a computer system to boot up from a boot image corresponding to its platform. In this case, a boot image is provided in the second track for each of the platforms to be supported. Furthermore, the second packet 306 may include other well known data such as ISO root directories in blocks B39 and B46 for mode 1 and mode 2 devices, respectively. Additionally, in accordance the UDF standard, the well known anchor volume descriptor pointer is provided in block B256 for the CD-RW disc.

FIG. 4 shows a more detailed list of descriptions of logical and physical blocks for mode 1 and mode 2 formats in accordance with one embodiment of the present invention. As shown, The CD-RW disc 300 includes blocks B16, B17, B18, and B252 for writing various information. For example, the block B16 stores the primary volume descriptor in accordance with the conventional ISO-9660 standard. The primary volume descriptor includes, for example, well known information such as volume descriptor type, standard identifier, volume descriptor version, system identifier, volume identifier, volume set size, volume sequence number, logical block size, path table size, directory record for root directory, etc. On the other hand, the block B17 stores boot record volume descriptors, which point to the locations of the associated boot catalogs in physical blocks 41 and 48 in the second packet 306. For example, CD/OS boot block with a pointer to the boot catalog can be written amidst other ISO-9660 data. It should be noted that more than one boot record volume descriptor and boot catalog may be provided in the disc 200 to accommodate a plurality of platforms. Additionally, the first packet 302 may include other ISO-9660 data such as "Read Me" files to inform the user what the disc is. Other UDF data may also be provided in subsequent packets such as UDF driver for installation, final volume descriptor sequence (VDS), the AVDP, and the like.

For example, UDF data such as logical volume descriptor sequence (VDS) is written onto designated blocks. As is well known in the art, the term "descriptor" refers herein to descriptive information about a disc and how to read its contents. For example, the VDS provides descriptive information such as partitioning of an optical disc, type of medium and size of the optical disc, etc. On the other hand, the AVDP is an identifying mark that indicates that the optical disc contains an UDF file system.

In one embodiment, the boot record volume descriptor in block B17 contains information as defined in El Torito standard and shown in the following Table 1.

TABLE 1

| Offset | Type | Description |
|---|---|---|
| 0 | Byte | Boot Record Indicator, must be 0 |
| 1–5 | Byte | ISO-9660 Identifier, must be "CD001" |
| 6 | Byte | Version of this descriptor, must be 1 |
| 7–26 | Byte | Boot System Identifier, must be "EL TORITO SPECIFICATION" padded with 0's |
| 27–46 | Byte | Unused, must be 0 |
| 47–4A | Dword | Absolute pointer to first sector of Boot Catalog |
| 4A–uFF | Byte | Unused, must be 0 |

To distinguish the two boot images 310 and 312, for example, the El Torito header at block B17 points to a boot catalog at a sector such as 30. A drive that does not block the bad sectors (e.g., mode 1 drive) will read physical block 30 while a drive that blocks the bad sectors (e.g., mode 2 drive) will read physical block 37. Physical blocks 30 and 37 then point to the associated boot images. Of the fragmented boot image, only the good data is written as the bad blocks are preferably created by the CD-RW disc drive.

As discussed above, the boot images 310 and 312 in the CD-RW disc 300 will include more than one packet and one link block. FIGS. 5A and 5B illustrate a more detailed schematic block diagram of the mode 1 boot image 310 in accordance with one embodiment of the present invention. In FIG. 5A, a mode 1 boot image 310A is generated from a source medium boot image, preferably an emulated version, of a 1.44 Kbyte floppy disk. The source boot image is written into the CD-RW disc 300 in units of 32 blocks or 64 Kbytes. When the first 32 blocks 504 have been written, then the CD-RW drive generates and writes 7 blocks or 14 Kbytes of link data 506. Then, the remaining boot image data are written in units of 32 data blocks followed by 7 link blocks until all source boot image has been written as the mode 1 boot image 310.

In another embodiment, the CD-RW drive or the host computer system may assemble or construct a complete mode 1 boot image from the source boot image as shown in FIG. 5B. In this diagram, the CD-RW drive or the host computer system may insert 7 link blocks between every 32 blocks of usable data. For example, link blocks 554 and 558 may be inserted in the original source boot image to generate a complete mode 1 boot image 310B, which may then be written sequentially onto the CD-RW disc.

The boot image 310 is a block-by-block copy of a bootable source medium such as a MS-DOS (i.e., FAT12) floppy disk, hard disk, removable disk, etc. As with most magnetic media, these disks have a way to handle bad blocks or sectors. By thus taking advantage of the bad blocks in the bootable source medium to occur at the locations corresponding to link blocks, the interruptions in reading a boot image in a CD-RW disc is eliminated so that the computer system may boot up without interruptions.

By way of example, the file allocation table (FAT) is usually in the first 64 Kbytes (i.e., 32 blocks) of a floppy disk. Based on the observation that a floppy disk has the same ratio of 64 Kbytes of good data (i.e., 128 floppy blocks of 512 bytes or 32 CD-RW blocks of 2,048 bytes) and 14 Kbytes of bad data (i.e., 28 floppy blocks or 7 CD-RW blocks), the floppy disk boot image is then written to the CD-RW disc in such as way that only the good data is actually written while the bad data is skipped. Accordingly, the emulated boot image written on the CD-RW disc appears as the same copy of the original image to a mode 1 drive. This is because the boot BIOS honors the bad block mapping of the original floppy. To the boot BIOS, the boot image that the mode 1 device is booting from appears as a boot image from a floppy disk with bad blocks. Thus, a computer system may properly boot up form the mode 1 boot image on the CD-RW without interruption.

Figure 6:
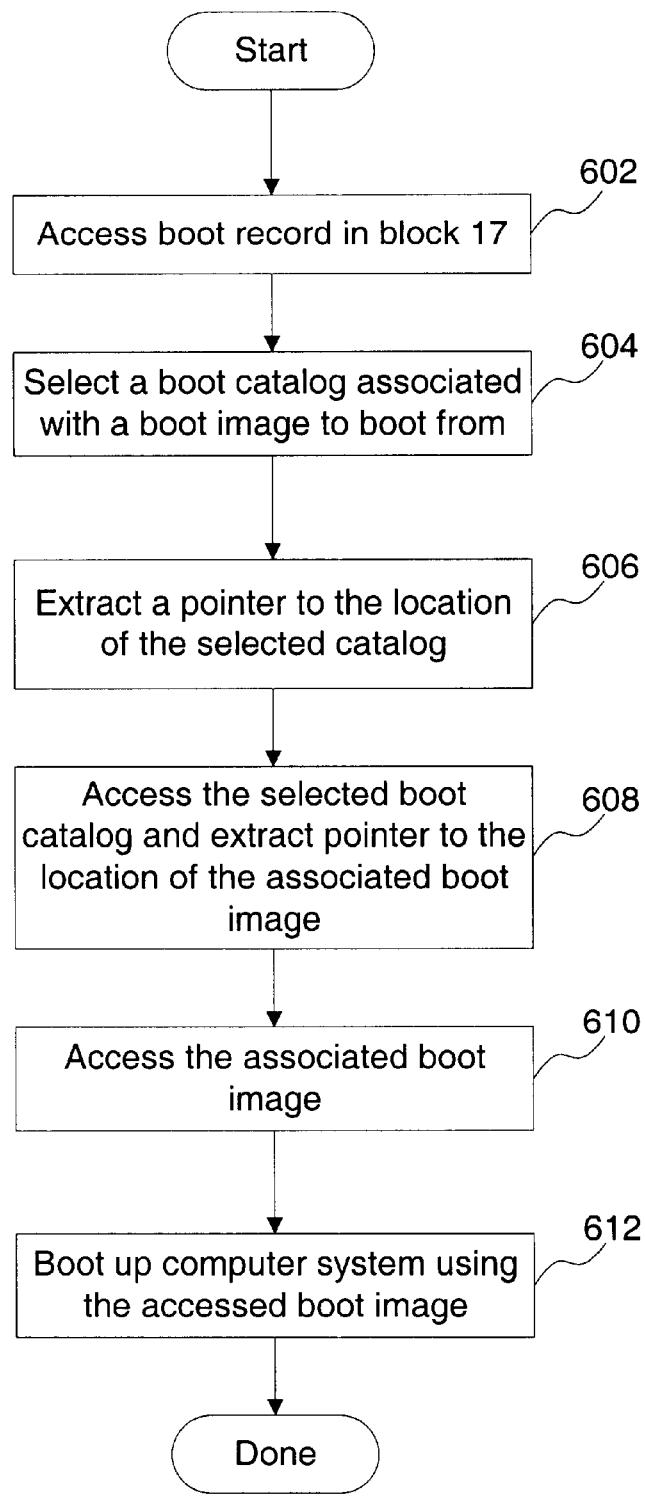
FIG. 6 shows a flowchart of a method for booting up a computer system from a bootable disc in accordance with one embodiment of the present invention.

A computer system may use the bootable disc 300 to boot up. FIG. 6 shows a flowchart of a method for booting up a computer system from a bootable disc 300 in accordance with one embodiment of the present invention. In this method, the boot record in block B17 of the first packet is accessed in operation 602 and a boot catalog associated with a boot image to boot from is selected in operation 604. Then, a pointer to the selected boot catalog is extracted in operation 606. With the extracted pointer, the selected boot catalog is accessed and a pointer to the location of the associated boot image is extracted in operation 608. Using the pointer to the boot image, the associated boot image is accessed in operation 610. The boot image is then used to boot up the computer system by loading the boot image into a memory unit and executing the boot image instructions.

The boot image emulates a source medium such as a floppy disk (e.g., 1.44 Mbyte floppy disk, 2.8 Mbyte floppy disc, etc.), a hard disk, removable disk, or any bootable source medium. By thus emulating a source medium having bad sectors or blocks that correspond to link blocks of packet CD-RW discs, boot images of any suitable size can be simulated and written in the CD-RW discs. This ensures a computer system to boot up properly without interruption and lock up.

Figure 7:
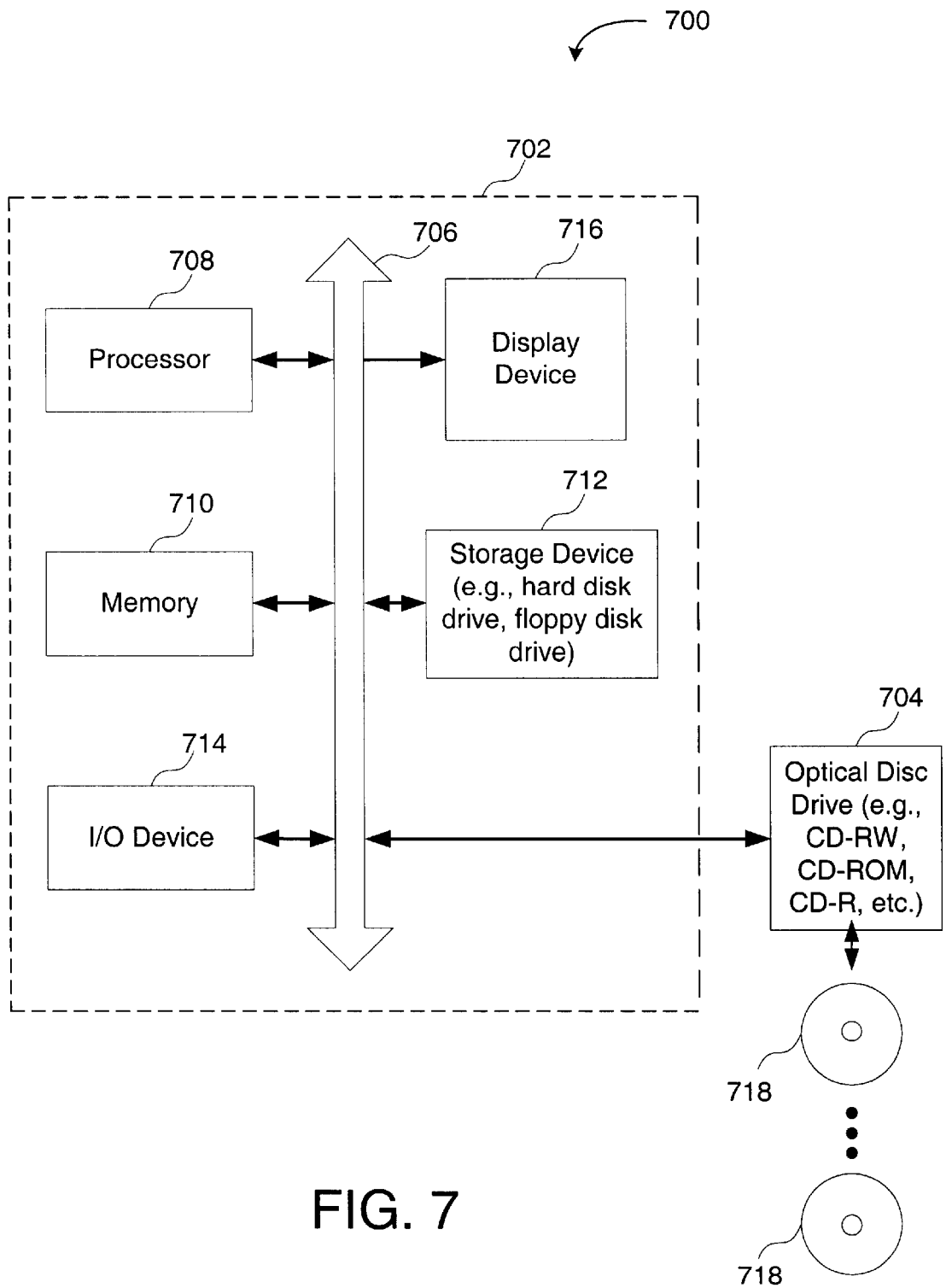
FIG. 7 shows a block diagram of an exemplary computer system including a host computer and an optical disc drive in accordance with one embodiment of the present invention.

FIG. 7 shows a block diagram of an exemplary computer system 700 including a host computer 702 and an optical disc drive 704 in accordance with one embodiment of the present invention. The optical disc drive 704 may be any device suitable for recording data on optical discs such as CD-R drive, CD-RW drive, and the like. It should be appreciated that the computer system 700 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer system 700 and are executed by processors therein.

The host computer 702 includes a bus 706 for communicating information, a processor 708 coupled to the bus for processing information (e.g., instructions, programs, data, etc.), a memory 710 coupled to the bus 706 for storing information and instructions for the processor 708, and a storage device 712 coupled to the bus 706 for storing information and instructions. The storage device 712 in the host computer 702 may include one or more hard disk drives, floppy disk drives, removable disk drives, optical disc drives, tape drives, CD-ROM drives, or any number of other types of storage devices having media for storing data digitally.

The optical disc drive 704 is coupled to the bus 706 for communicating information to the host computer 702 through the use of optical media 718 such as CD-RW discs, CD-R discs, CD-ROM discs, DVD-ROM discs, DVD-RAM discs, etc. The optical disc drive 704 may be provided either internally within the host computer 702 or externally through a cable. The optical disc drive 704 is coupled to the computer system 700 through a bus such as SCSI, IDE, ATAPI, etc. The host computer 702 also includes and an I/O device 714 coupled to the bus for inputting and/or outputting information and a display device 716 coupled to the bus 706 for displaying information to the computer user.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for writing fixed packet data to create a re-writable compact disc that is bootable in dual modes, each fixed packet including a set of data blocks, wherein a set of link blocks separates two consecutive fixed packets, the method comprising:

writing a first packet onto a re-writable compact disc including a boot record that has a pair of pointers for pointing to locations of associated boot catalogs, wherein one pointer is used to point to a location of an associated boot catalog;

creating an emulated boot image of a source medium for the re-writable compact disc;

for a first device that is capable of reading the link blocks, writing a first boot catalog in a second packet, wherein the first boot catalog includes a pointer to a location of a first boot image that can be executed to boot up a computer system;

for a second device that is capable of skipping the link blocks, writing a second boot catalog in the second packet, wherein the second boot catalog includes a pointer to a location of a second boot image that can be executed to boot up the computer system;

writing the first boot image by emulating the source medium having bad sectors that correspond to the locations of the link blocks in the compact disk such that reading of the first boot image is not interrupted when booting up the computer system from the first boot image; and writing the second boot image without emulating the bad sectors corresponding to the locations of the link blocks in the compact disk.

2. The method as recited in claim 1, wherein the computer system boots up from the first boot image when the first device is a mode 1 device adapted to read both data and link blocks.

3. The method as recited in claim 1, wherein the computer system boots up from the second boot image when the second device is a mode 2 device that is adapted to read only data blocks while skipping the link blocks.

4. The method as recited in claim 1, wherein each fixed packet includes 32 data blocks and each link block includes 7 blocks.

5. The method as recited in claim 4, wherein the operation of writing the first packet includes:

writing primary volume descriptors in a data block 16; and writing the boot record in a data block 17.

6. The method as recited in claim 4, wherein each of the first and second boot images is written over a plurality of consecutive packets.

7. The method as recited in claim 4, wherein the second packet includes a root directory, a mode 1 tools directory, and a mode 2 tools directory.

8. The method as recited in claim 4, wherein the first boot catalog is written in a logical data block 34 corresponding to a physical data block 41 of the second packet and wherein the second boot catalog is written in a logical data block 41 corresponding to a physical data block 48 of the second packet.

9. The method as recited in claim 1, wherein the second and third boot images are written in packets after the first and second packets.

10. The method as recited in claim 1, wherein an anchor volume descriptor pointer is written in block 256 for pointing to a logical volume descriptor sequence containing a virtual partition.

11. The method as recited in claim 1, wherein the compact disc is a CD-RW disc.

12. The method as recited in claim 1, wherein the source medium is a disk selected from a group consisting of a floppy disk, a hard disk, and a removable disk.

13. The method as recited in claim 1, wherein a computer system boots up from the bootable compact disc by:

accessing the boot record;

selecting a boot image to boot from;

extracting the pointer to the location of the boot catalog associated with the selected boot image;

accessing the boot catalog associated with the selected boot image and extracting the pointer to the location of the selected boot image;

accessing the selected boot image; and booting up the computer system using the accessed boot image.

14. The method as recited in claim 1, wherein the boot image is written as the first boot image by inserting the bad sectors equal to the link blocks between each pair of data packets.

15. The method as recited in claim 1, wherein the boot image is created to include the bad sectors corresponding to the link blocks between each pair of data packets.

16. A method for writing data packet to create a bootable CD-RW disc, each data packet including a set of data blocks, wherein a set of link blocks separates a pair of consecutive data packets, the method comprising:

writing a first packet onto a CD-RW disc including a boot record for pointing to a location of a first boot catalog;

writing the first boot catalog for pointing to a location of a first boot image that can be executed to boot up a computer system, the computer system being configured to use a device capable of reading the link blocks;

generating a boot image of a source medium for the CD-RW disc; and writing the boot image as a first boot image by emulating the source medium having bad sectors that correspond to the locations of the link blocks in the compact disk such that reading of the first boot image is not interrupted when booting up the computer system from the first boot image.

17. The method as recited in claim 16, further comprising:

writing a second boot catalog for pointing to a location of a second boot image that can be executed to boot up the computer system that is capable of mapping out the link blocks; and writing the boot image as a second boot image without emulating the bad sectors corresponding to the locations of the link blocks in the compact disk.

18. The method as recited in claim 16, wherein the first boot image is written from the emulated boot image by inserting the bad sectors equal to the link blocks between each pair of data packets.

19. The method as recited in claim 16, wherein the first boot image is created and written to include bad sectors corresponding to the link blocks between each pair of data packets.

20. The method as recited in claim 17, wherein the computer system boots up from the first boot image when the computer system includes a mode 1 device adapted to read both data and link blocks and wherein the computer system boots up from the second boot image when the computer system includes a mode a mode 2 device that is adapted to read only data blocks while skipping the link blocks.

21. The method as recited in claim 16, wherein each fixed packet includes 32 data blocks and each link block includes 7 blocks, and wherein the operation of writing the first packet includes:

writing primary volume descriptors in a data block 16; and writing the boot record in a data block 17.

22. The method as recited in claim 21, wherein each of the first and second boot images is written over a plurality of consecutive packets.

23. The method as recited in claim 17, wherein a second packet includes the first and second boot catalogs for pointing to the locations of the first and second boot images, respectively.

24. The method as recited in claim 23, wherein the first and second boot catalogs are written in a second packet, wherein the first boot catalog is written in a logical data block 34 corresponding to a physical data block 41 of the second packet and wherein the second boot catalog is written in a logical data block 41 corresponding to a physical data block 48 of the second packet.

25. The method as recited in claim 23, wherein the second and third boot images are written in packets after the first and second packets.

26. The method as recited in claim 23, wherein an anchor volume descriptor pointer is written in block 256 for pointing to a logical volume descriptor sequence containing a virtual partition.

27. The method as recited in claim 16, wherein the source medium is a disk selected from a group consisting of a floppy disk, a hard disk, and a removable disk.

28. The method as recited in claim 16, wherein a computer system boots up from the bootable compact disc by:

accessing the boot record;

selecting a boot image to boot from;

extracting the pointer to the location of the boot catalog associated with the selected boot image;

accessing the boot catalog associated with the selected boot image and extracting the pointer to the location of the selected boot image;

accessing the selected boot image; and booting up the computer system using the accessed boot image.

29. A computer readable medium for writing fixed data packet to create a bootable optical disc, each data packet including a set of data blocks, wherein a set of link blocks separates a pair of consecutive data packets, the method comprising:

writing a first packet onto an optical disc including a boot record for pointing to locations of at least two boot catalogs;

for a mode 1 device that is capable of reading the link blocks, writing a first boot catalog for pointing to a location of a first boot image that can be executed to boot up a computer system that uses a mode 1 device;

for a mode 2 device that is capable of mapping out the link blocks, writing a second boot catalog for pointing to a location of a second boot image that can be executed to boot up the computer system that uses a mode 2 device;

generating an emulated boot image of a source medium for the optical disc;

writing the emulated boot image as the first boot image by emulating the source medium having bad sectors that correspond to the locations of the link blocks in the compact disk such that reading of the first boot image is not interrupted when booting up the computer system from the first boot image; and writing the emulated boot image as the second boot image without emulating the bad sectors corresponding to the locations of the link blocks in the compact disk.

30. The computer readable medium as recited in claim 29, wherein program instruction writes the first boot image from the emulated boot image by inserting the bad sectors equal to the link blocks between each pair of fixed data packets.

31. The computer readable medium as recited in claim 29, wherein the program instruction writes the first boot image to include bad sectors corresponding to the link blocks between each pair of fixed data packets.

32. The computer readable medium as recited in claim 29, wherein the computer system boots up from the first boot image when the first device is a mode 1 device adapted to read both data and link blocks and wherein the computer system boots up from the second boot image when the second device is a mode 2 device that is adapted to read only data blocks while skipping the link blocks.

33. The computer readable medium as recited in claim 29, wherein each fixed packet includes 32 data blocks and each link block includes 7 blocks, and wherein the operation of writing the first packet includes:

writing primary volume descriptors in a data block 16; and writing the boot record in a data block 17.

34. The computer readable medium as recited in claim 29, wherein each of the first and second boot images is written over a plurality of consecutive packets.

35. The computer readable medium as recited in claim 33, wherein the second packet includes the first and second boot catalogs for pointing to the locations of the first and second boot images, respectively.

36. The computer readable medium as recited in claim 33, wherein the second and third boot images are written in packets after the first and second packets.

37. The computer readable medium as recited in claim 29, wherein the source medium is a disk selected from a group consisting of a floppy disk, a hard disk, and a removable disk.

38. The computer readable medium as recited in claim 29, wherein a computer system boots up from the bootable compact disc by:

accessing the boot record;

selecting a boot image to boot from;

extracting the pointer to the location of the boot catalog associated with the selected boot image;

accessing the boot catalog associated with the selected boot image and extracting the pointer to the location of the selected boot image;

accessing the selected boot image; and booting up the computer system using the accessed boot image.

39. The computer readable medium as recited in claim 29, wherein the optical disc is a CD-RW.

40. A method for writing fixed packet data to create a re-writable compact disc that enables booting of a computer, each fixed packet including a set of data blocks, wherein link blocks separate consecutive fixed packets, the method comprising:

writing a first packet onto the re-writable compact disc including a boot record that has at least one pointer for pointing to a location of an associated boot catalog;

creating a boot image of a source medium for the re-writable compact disc;

for a device that is capable of skipping the link blocks, writing a boot catalog in a second packet, wherein the boot catalog includes a pointer to a location where the boot image is to be written, the boot image capable of being executed to boot up the computer system; and writing the boot image without emulating bad sectors corresponding to locations of the link blocks on the re-writable compact disc.

41. A method for packet writing data to create a re-writable compact disc that enables booting of a computer, each packet including a set of data blocks, the method comprising:

writing a first packet onto a re-writable compact disc including a boot record that has at least one pointer for pointing to a location of an associated boot catalog;

writing a boot catalog, wherein the boot catalog includes a pointer to a location where a boot image is to be written, the boot image capable of being executed to boot up the computer system; and writing the boot image to the re-writable compact disc.

42. A method for packet writing data to create a re-writable media that enables booting of a computer, each packet including data blocks, the method comprising:

writing a first packet onto a re-writable media including a boot record that has a pointer to a location of a boot catalog; and writing the boot catalog, wherein the boot catalog includes a pointer to a location where a boot image is to be written, the boot image capable of being executed to boot up the computer system.

43. A method according to claim 42, further comprising:

writing the boot image to the re-writable media.

\* \* \* \* \*